(12) United States Patent
Gaither et al.

(10) Patent No.: US 11,621,461 B2
(45) Date of Patent: Apr. 4, 2023

(54) BAR MODULE TERMINAL ASSEMBLIES HAVING PAIRS OF ELONGATED TERMINAL PLATES

(71) Applicant: Toyota Motor Engineering & Manufacturing North America, Inc., Plano, TX (US)

(72) Inventors: Geoffrey D. Gaither, Brighton, MI (US); Brian Schneidewind, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 205 days.

(21) Appl. No.: 16/775,795

(22) Filed: Jan. 29, 2020

(65) Prior Publication Data

US 2021/0234143 A1    Jul. 29, 2021

(51) Int. Cl.
*H01M 50/543* (2021.01)
*H01M 50/20* (2021.01)

(52) U.S. Cl.
CPC ......... *H01M 50/543* (2021.01); *H01M 50/20* (2021.01); *H01M 2220/20* (2013.01)

(58) Field of Classification Search
CPC ............................ H01M 50/543; H01M 2/202
See application file for complete search history.

(56) References Cited

U.S. PATENT DOCUMENTS

| | | | |
|---|---|---|---|
| 9,312,521 B2 * | 4/2016 | Ohta | H01M 50/10 |
| 9,324,986 B2 * | 4/2016 | Ahn | H01M 50/502 |
| 9,457,743 B2 | 10/2016 | Soleski et al. | |
| 10,892,464 B2 * | 1/2021 | Ryu | H01M 50/507 |
| 2014/0335385 A1 | 11/2014 | Ikeya et al. | |
| 2019/0280277 A1 | 9/2019 | Kato | |

FOREIGN PATENT DOCUMENTS

| | | |
|---|---|---|
| CN | 102414871 B | 3/2015 |
| CN | 109728208 A | 5/2019 |
| EP | 2752920 A1 | 7/2014 |
| WO | 2017017915 A1 | 2/2017 |
| WO | 2019059538 A1 | 3/2019 |
| WO | 2019124109 A1 | 6/2019 |

* cited by examiner

*Primary Examiner* — Maria Laios
*Assistant Examiner* — Jordan E Berresford
(74) *Attorney, Agent, or Firm* — Dinsmore & Shohl LLP (57) ABSTRACT

A battery pack assembly includes a plurality of battery cells and a pair of elongated connector terminal plates. Each battery cell has a terminal side and an opposite floor side. A pair of terminals extend from each of the plurality of battery cells on the terminal side. Each of the pair of elongated connector terminal plates includes an upper and a lower elongated terminal connector. The upper and lower elongated terminal connector plates of each of the pair of elongated connector terminal plates are configured to independently move between an aligned position and an engaged position such that in the engaged position the pair of elongated connector terminal plates retain the plurality of battery cells and in the aligned position the pair of elongated connector terminal plates are removed from the battery pack releasing the plurality of battery cells.

20 Claims, 7 Drawing Sheets

BAR MODULE TERMINAL ASSEMBLIES HAVING PAIRS OF ELONGATED TERMINAL PLATES

TECHNICAL FIELD

The present specification generally relates to a vehicle battery pack and, more specifically, to the vehicle battery packs and removal features thereof.

BACKGROUND

Hybrid electric vehicles include battery packs that further include a stack of battery cells and a bus bar module provided on top of the stack of battery cells. The bus bar module is generally configured to carry a voltage and current to a component of the vehicle (e.g., a powertrain component of the vehicle). Each of the plurality of cells includes a pair of externally threaded terminals. The bus bar module includes a plurality of housings that each include a terminal plate for connecting to the terminals of the cells and a bus bar. The terminal plates of the bus bar module are secured to the externally threaded terminals of the plurality of cells by nuts. As such, the bus bar module extends the entire length of the battery pack. To gain access to the individual battery cell, all of the nuts along the length of the bus bar module must be removed in order to remove the bus bar module.

Accordingly, a need exists for a device that enables quick access to each battery cell within the battery pack while providing voltage and current from the battery pack to a component of the vehicle.

SUMMARY

In one embodiment, a battery pack assembly is provided. The battery pack assembly includes a plurality of battery cells and a pair of elongated connector terminal plates. Each battery cell of the plurality of battery cells has a pair of terminals extending from each of the plurality of battery cells. The pair of elongated connector terminal plates extend a length across the battery pack. Each of the pair of elongated connector terminal plates includes an upper elongated terminal connector plate and a lower elongated terminal connector plate. The upper elongated terminal connector plate and the lower elongated terminal connector plate of each of the pair of elongated connector terminal plates are configured to independently move between an aligned position and an engaged position. In the engaged position, the pair of elongated connector terminal plates engage the pair of terminals of the plurality of battery cells to inhibit removal of the plurality of battery cells from the battery pack assembly and in the aligned position the pair of elongated connector terminal plates disengage from the pair of terminals of the plurality of battery cells.

In another embodiment, an assembly is provided. The assembly includes a battery pack, an upper elongated terminal connector plate, and a lower elongated terminal connector plate. The battery pack has a plurality of battery cells. Each of the plurality of battery cells include a pair of terminals. The upper elongated terminal includes upper openings that correspond to each of the pair of terminals. The lower elongated terminal connector plate includes lower openings that correspond to each of the pair of terminals. The upper elongated terminal connector plate and the lower elongated terminal connector plate are each configured to independently move between an aligned position and an engaged position. In the aligned position, the upper openings and the lower openings are coaxially aligned to each receive at least a portion of the pair of terminals of each of the plurality of battery cells. In the engaged position, a portion of each of the upper openings and the lower openings engage the pair of terminals of each the plurality of battery cells to inhibit removal of the plurality of battery cells from the battery pack assembly.

In yet another embodiment, a method of removing a battery cell from a battery pack assembly is provided. The method includes removing a pair of fasteners that extend through an upper elongated terminal connector plate and a lower elongated terminal connector plate, displacing the upper elongated terminal connector plate linearly in one direction such that an upper opening of the upper elongated terminal connector plate is aligned with at least one terminal of an at least one battery cell of the battery pack assembly, and removing the upper elongated terminal connector plate from around the at least one terminal of the at least one battery cell. The method continues by displacing the lower elongated terminal connector plate linearly in an opposite direction such that a lower opening of the lower elongated terminal connector is aligned with the at least one terminal of the at least one battery cell of the battery pack assembly, removing the lower elongated terminal connector plate from around the at least one terminal of the at least one battery cell, and removing the at least one battery cell from the battery pack assembly.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to a battery pack assembly. The battery pack assembly includes a plurality of battery cells and a pair of elongated connector terminal plates. Each battery cell has a terminal side and an opposite floor side. A pair of terminals extend from each of the plurality of battery cells on the terminal side. The pair of terminals of each of the plurality of battery cells are provided with a post that extends upwardly from a terminal surface of each of the plurality of battery cells on the terminal side. A flange extends radially outward from a distal end of the post. The pair of elongated terminal connector plates extend across a length of the battery pack. Each of the pair of elongated connector terminal plates includes an upper elongated terminal connector plate and a lower elongated terminal connector plate. The upper elongated terminal connector plate has a plurality of upper openings and the lower elongated terminal connector plate has a plurality of lower openings. The flange has a diameter that is smaller than the diameter of the plurality of upper and lower openings. The upper elongated terminal connector plate and the lower elongated terminal connector plate are both provided on the terminal side of the battery cells.

The upper elongated terminal connector plate and the lower elongated terminal connector plate of each of the pair of elongated connector terminal plates are configured to independently move between an aligned position and an engaged position. In the aligned position, the upper openings and the lower openings are coaxially aligned to each receive at least a portion of the pair of terminals of each of the plurality of battery cells. In the engaged position, a portion of each of the upper openings and the lower openings engage the pair of terminals of each the plurality of battery cells to inhibit removal of the plurality of battery cells from the battery pack assembly. To achieve the engaged position, the upper elongated terminal connector plate is linearly displaced in one direction and the lower elongated terminal connector plate is linearly displaced in an opposite direction such that the plurality of upper and lower openings are configured to engage with a portion of the pair of terminals of each of the plurality of battery cells.

Further, the plurality of upper and lower openings each include an inner or side edge. A portion of each of the side edges is conductive such that in the engaged position, the upper elongated terminal connector plate and the lower elongated terminal connector plate are electrically coupled to each of the plurality of battery cells via the pair of terminals. As such, the pair of elongated terminal plates electrically connect each battery cell of the plurality of battery cells into a series configuration to transmit an energy stored within each battery cell of the plurality of battery cells to a component of a vehicle while replacing a conventional bus bar module.

As used herein, the term "communicatively coupled" means that coupled components are capable of exchanging electric signals with one another such as, for example, electrical energy via conductive medium or a non-conductive medium, and the like.

Figure 1:
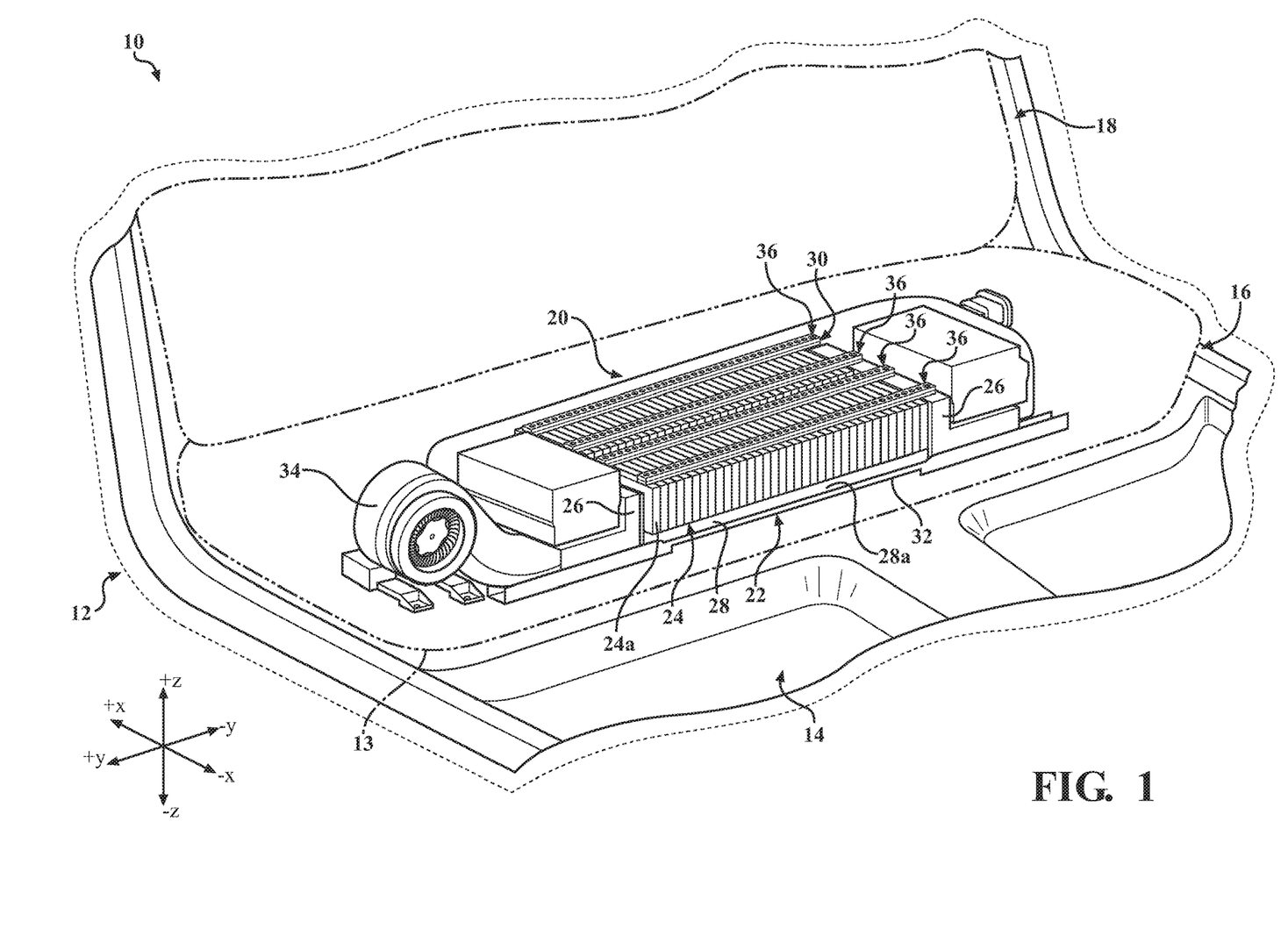
FIG. 1 schematically depicts a partial view of a vehicle and a battery pack assembly, according to one or more embodiments shown or described herein.

As used herein, the term "longitudinal direction" refers to the forward-rearward direction of the battery pack assembly (i.e., in the +/−X-direction depicted in FIG. 1). The term "lateral direction" refers to the cross-battery pack assembly (i.e., in the +/−Y-direction depicted in FIG. 1), and is transverse to the battery pack assembly longitudinal direction. The term "vertical direction" or "up" or "above" refer to the upward-downward direction of the battery pack assembly (i.e., in the +/−Z-direction depicted in FIG. 1).

Figure 2:
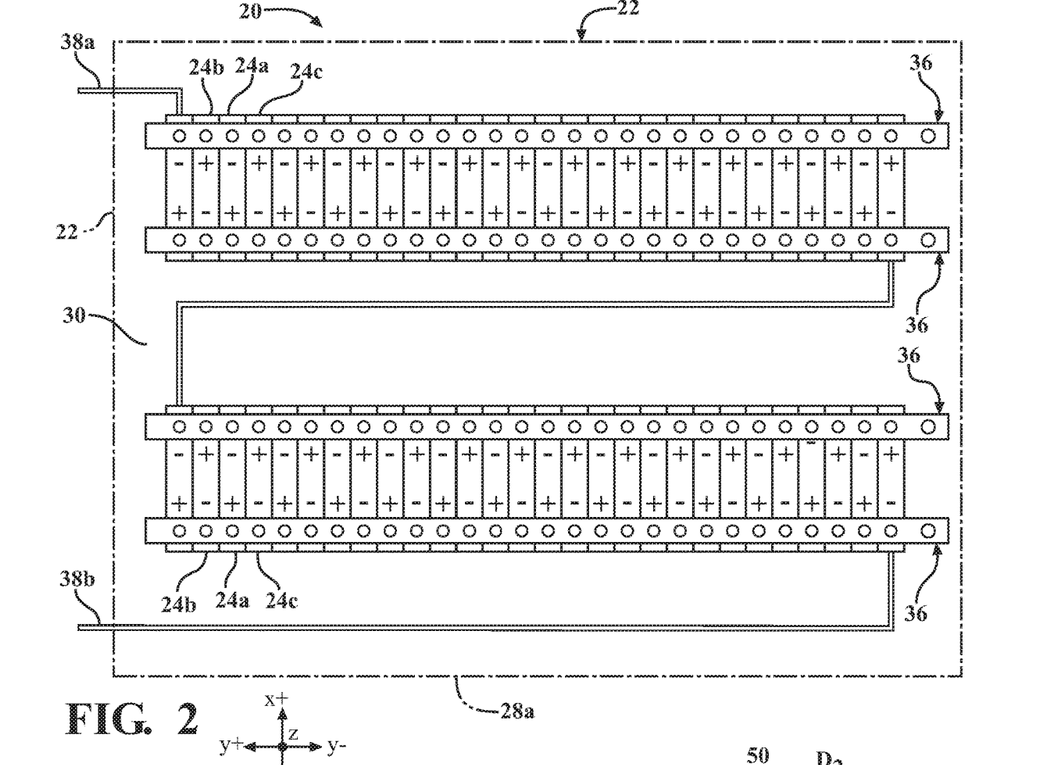
FIG. 2 schematically depicts a top view of the battery pack assembly of FIG. 1, according to one or more embodiments shown or described herein.
Figure 3:
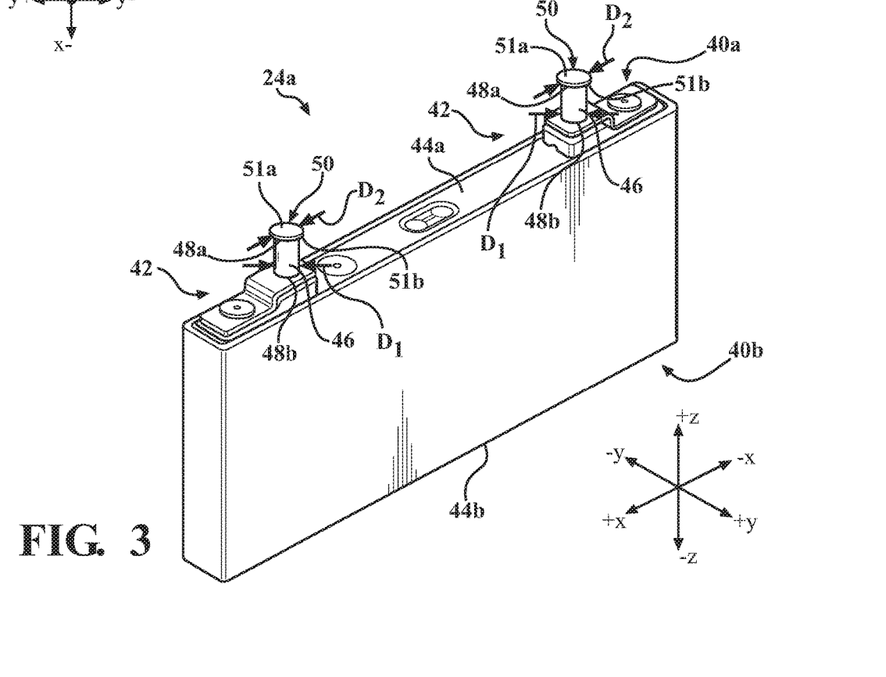
FIG. 3 schematically depicts a perspective view of a battery cell of the battery pack assembly of FIG. 1, according to one or more embodiments described herein.

Vehicles that incorporate elements according to the present disclosure may include a variety of battery pack assemblies that are conventionally known, including battery pack assemblies that are used in marine applications such as within boats, aerospace applications such as within airplanes, and/or in vehicle applications, such as cars, trucks, sport utility vehicles, and the like. It should be appreciated that the vehicle may be a hybrid vehicle, an electric vehicle, a conventional vehicle, and the like. Further, battery pack assemblies may be used in home applications, such as tools, appliances, and the like. Referring to FIGS. 1-3, a vehicle 10 including a passenger compartment 12 is shown. The passenger compartment 12 includes a seat 13 and a seat frame 14. The seat frame 14 incudes a seat portion 16 and a seat back portion 18. In some embodiments, a battery pack assembly 20 has a plurality of battery cells 24 and is positioned within or mounted below the seat portion 16 of the seat frame 14. It should be appreciated that the plurality of battery cells 24 includes a plurality of individual battery cells 24a. It should also be appreciated that the battery pack assembly 20 may be positioned anywhere within the passenger compartment 12, an engine compartment, a storage compartment, such as a trunk or a truck bed, and the like, within the vehicle 10. It is also appreciated that the battery pack assembly 20 may be positioned within or mounted to a frame of the vehicle 10.

The battery pack assembly 20 includes a housing 22 that houses a plurality of battery cells 24. It should be appreciated that the plurality of battery cells 24 are illustrated as being in two rows in the lateral direction (i.e. in the +/−Y direction), this is non-limiting and the plurality of battery cells 24 may be positioned within the housing 22 in a plurality of configurations and arrangements. For instance, the plurality of battery cells 24 may be positioned within the housing 22 in a column configuration, or in the longitudinal direction (i.e., in the +/−Z direction).

The housing 22 includes a pair of end retaining walls 26 and a pair of side retaining walls 28 that define a housing interior portion 30 that includes a floor surface 32. In some embodiments, the end retaining walls 26 and the side retaining walls 28 each extend in a vertical direction (i.e., in the +/−Z direction). Further, in some embodiments, the end retaining walls 26 each extend in the vertical direction (i.e., in the +/−Z direction) a greater distance than the side retaining walls 28. The side retaining walls 28 further include an outer surface 28a that is positioned outside of each of the plurality of battery cells 24 positioned within the housing interior portion 30 of the housing 22.

In some embodiments, the battery pack assembly 20 may include a cooling mechanism 34. The cooling mechanism 34 forces airflow above and/or beneath each battery cell 24a of the plurality of battery cells 24 to cool the plurality of battery cells 24.

The battery pack assembly 20 further includes a pair of elongated terminal plates 36 extending across a length of the plurality of battery cells 24 in the lateral direction (i.e., in the +/−Y direction). It should be appreciated that the pair of elongated terminal plates 36 extend in a direction transverse to the plurality of battery cells 24. For instance, in the column configuration, the pair of elongated terminal plates 36 extend in the longitudinal direction (i.e., in the +/−X direction). In another example, when the plurality of battery cells 24 are arranged in a row configuration, as shown in FIG. 1, the pair of elongated terminal plates 36 extend in the lateral direction (i.e., in the +/−Y direction).

The pair of elongated terminal plates 36 assist in retaining the plurality of battery cells 24 within the housing 22. Further, the pair of elongated terminal plates 36 provide a conductive medium such that an energy stored in of each of the plurality of battery cells 24 may be carried through the pair of elongated terminal plates 36 to a different component of the vehicle, such as a powertrain, an inverter, and the like, as discussed in greater detail herein.

Referring to FIG. 2, each battery cell 24a of the plurality of battery cells 24 are communicatively coupled in series with each other. It should be understood that each row is communicatively coupled to other rows such that each battery cell 24a of the plurality of battery cells 24 are communicatively coupled in series. As such, adjacent battery cells 24b, 24c of battery cell 24a is positioned or arranged such that the polarity of the adjacent battery cells 24b, 24c is reversed compared to the battery cell 24a. That is, in one example, the battery cell 24a is arranged within the housing 22 with a positive terminal nearest to the outer surface 28a of the side retaining walls 28 of the housing 22 while a negative terminal is nearest to a center of the housing interior portion 30 of the housing 22. The adjacent battery cells 24b, 24c are each arranged within the housing 22 with a positive terminal nearest to the center of the housing interior portion 30 of the housing 22 while a negative terminal is nearest to the outer surface 28a of the side retaining walls 28 of the housing 22. As such, it is understood that the positive terminal of each of the plurality of battery cells 24 alternates such that every other battery cell has the same positive terminal polarity arrangement and the same applies for each negative terminal of the plurality of battery cells 24.

A pair of load wires 38a, 38b are communicatively coupled to the plurality of battery cells 24 such that an energy stored within the plurality of battery cells 24 may be transferred from the plurality of battery cells 24 to another component of the vehicle 10 via the pair of load wires 38a, 38b. It should be understood that the energy stored and/or transferred may be a voltage, a current, a power, and the like. It should be appreciated that the pair of load wires 38a, 38b may be a busbar, a wire, or other conductive medium that transfers the energy stored within the plurality of battery cells 24 to the components of the vehicle 10. In some embodiments, the component of the vehicle 10 may be a powertrain component. In other embodiments, the vehicle component is an inverter, a relay, fuses, other electrical components, and the like.

Referring now to FIG. 3, an isolated view of the battery cell 24a of the plurality of battery cells 24 is schematically depicted. It should be understood that while only the battery cell 24a of the plurality of battery cells 24 is described, the features apply to each battery cell of the plurality of battery cells 24. The battery cell 24a includes a terminal side 40a and an opposite housing side 40b. Further, the battery cell 24a includes a terminal surface 44a, which faces the terminal side 40a and a housing surface 44b that, in some embodiments, abuts the floor surface 32 of the housing 22. In other embodiments, the housing surface 44b is adjacent to the floor surface 32 of the housing 22. As such, in this embodiment, the battery cell 24a may not be in contact with the floor surface 32 of the housing 22. In other embodiments, portions of the housing surface 44b are in contact with portions of the floor surface 32 of the housing 22.

In some embodiments, a pair of terminals 42 extend from the terminal surface 44a of the battery cell 24a into the terminal side 40a. One of the pair of terminals 42 is generally known as a positive terminal and the other terminal of the pair of terminals 42 is generally known as a negative terminal. The pair of terminals 42 are each provided with a post 46 that extends upwardly from the terminal surface 44 of the battery cell 24a in the vertical direction (i.e., in the +/−Z direction). In some embodiments, the post 46 may be generally cylindrical and has a post diameter D1. In other embodiments, the post 46 may be a square, a rectangle, an octagon, and the like.

As such, it should be appreciated that the post 46 may be a uniform shape or an irregular shape. Further, in some embodiments, each post 46 of the pair of terminals 42 extend an equal length from the terminal surface 44 in the vertical direction (i.e., in the +/−Z direction) into the terminal side 40a of the battery cell 24a. In other embodiments, one post 46 of the pair of terminals 42 extends from the terminal surface 44a in the vertical direction (i.e., in the +/−Z direction), a different height than the other post 46 of the pair of terminals 42. For example, in some embodiments, each negative post may extend a height greater than the positive posts in the vertical direction (i.e., in the +/−Z direction). In other embodiments, each positive post may extend a height greater than the negative posts in the vertical direction (i.e., in the +/−Z direction).

Further, in other embodiments, some battery cells of the plurality of battery cells 24 may extend a height greater than the other battery cells of the plurality of battery cells 24 in the vertical direction (i.e., in the +/−Z direction). For instance, one row of battery cells of the plurality of battery cells 24 may be at a height greater than the other battery cells of the plurality of battery cells 24 in other rows in the vertical direction (i.e., in the +/−Z direction). In other embodiments, some battery cells within a row in the lateral direction (i.e., in the +/−Y direction) may also be at a height greater than the other battery cells in the same row in the vertical direction (i.e., in the +/−Z direction). For instance, every other battery cell may be at a height greater than the adjacent battery cell in the vertical direction (i.e., in the +/−Z direction). It should be understood that the above are non-limiting examples and that each battery cell of the plurality of battery cells may be in any configuration in any direction, such as angled, in varying heights, and the like.

Each post 46 of the pair of terminals 42 includes a distal end 48a and a proximate end 48b. The proximate end 48b abuts the terminal surface 44a. The distal end 48a is opposite the proximate end 48b. A flange 50 extends radially outward from the distal end 48 of the post 46. The flange 50 includes an outer surface 51a and an opposing inner surface 51b. In some embodiments, the flange 50 may be generally cylindrical and has a flange diameter D2. In other embodiments, the flange 50 may be a square, a rectangle, an octagon, and the like. As such, it should be appreciated that the flange 50 may be a uniform shape or an irregular shape. The flange diameter D2 is larger than the post diameter D1 of each post 46.

The size and shape of the battery cell 24a may depend on predetermined specifics such as the amount of energy to be stored, a temperature response of the battery cell, an amount of energy the vehicle requires, and the like. As such, the type of the battery cell 24a may vary. In some embodiments, the battery cell 24a is lithium ion (LI-Ion). In other embodiments, the battery cell 24a is a Molten Salt (Na—NiCl2), a Nickel Metal Hydride (Ni-MH), a Lithium Sulphur (Li—S), and the like.

Figure 4:
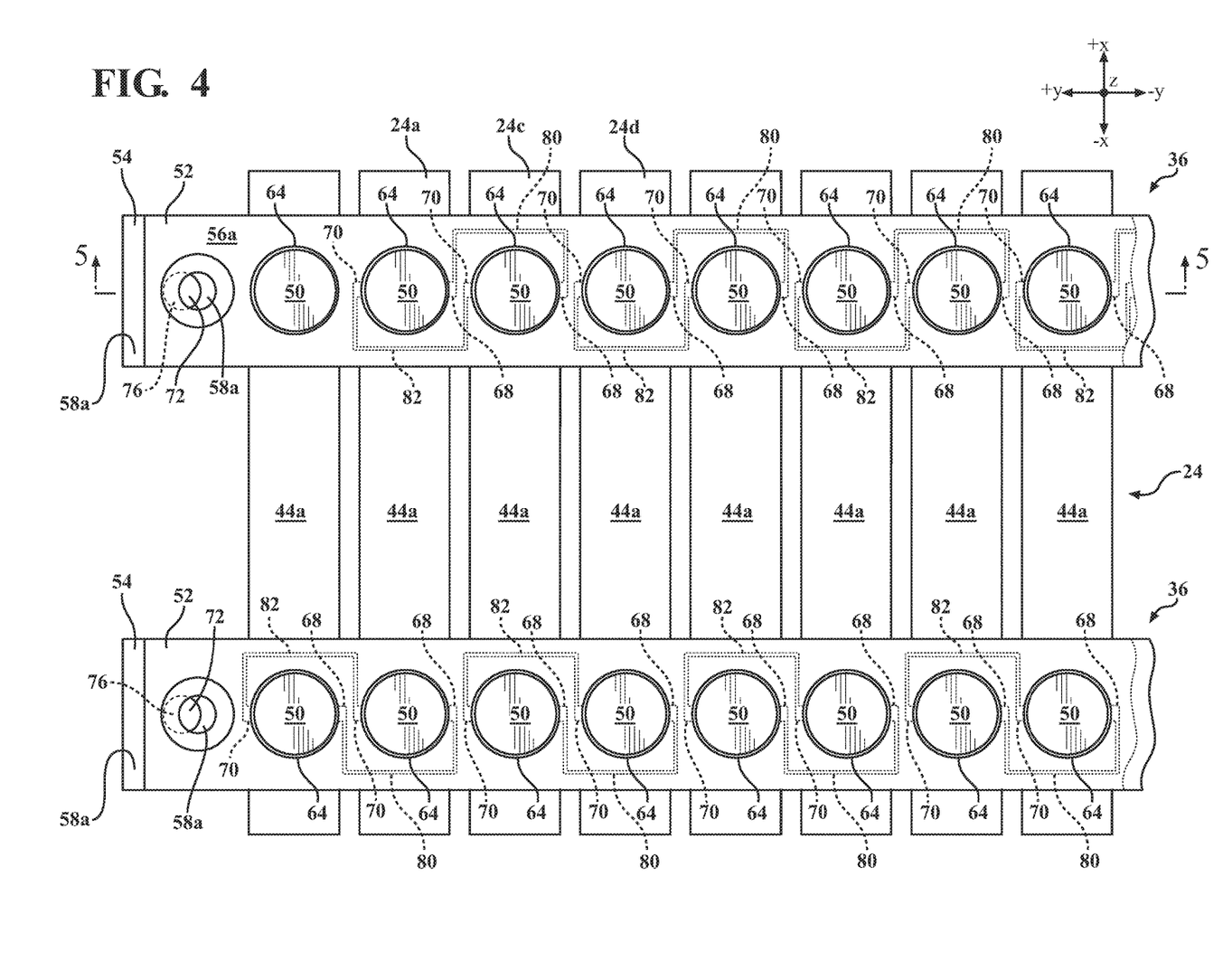
FIG. 4 schematically depicts a partial isolated top of the battery pack assembly of FIG. 1 with a pair of elongated terminal plates in an aligned position, according to one or more embodiments described herein.
Figure 5:
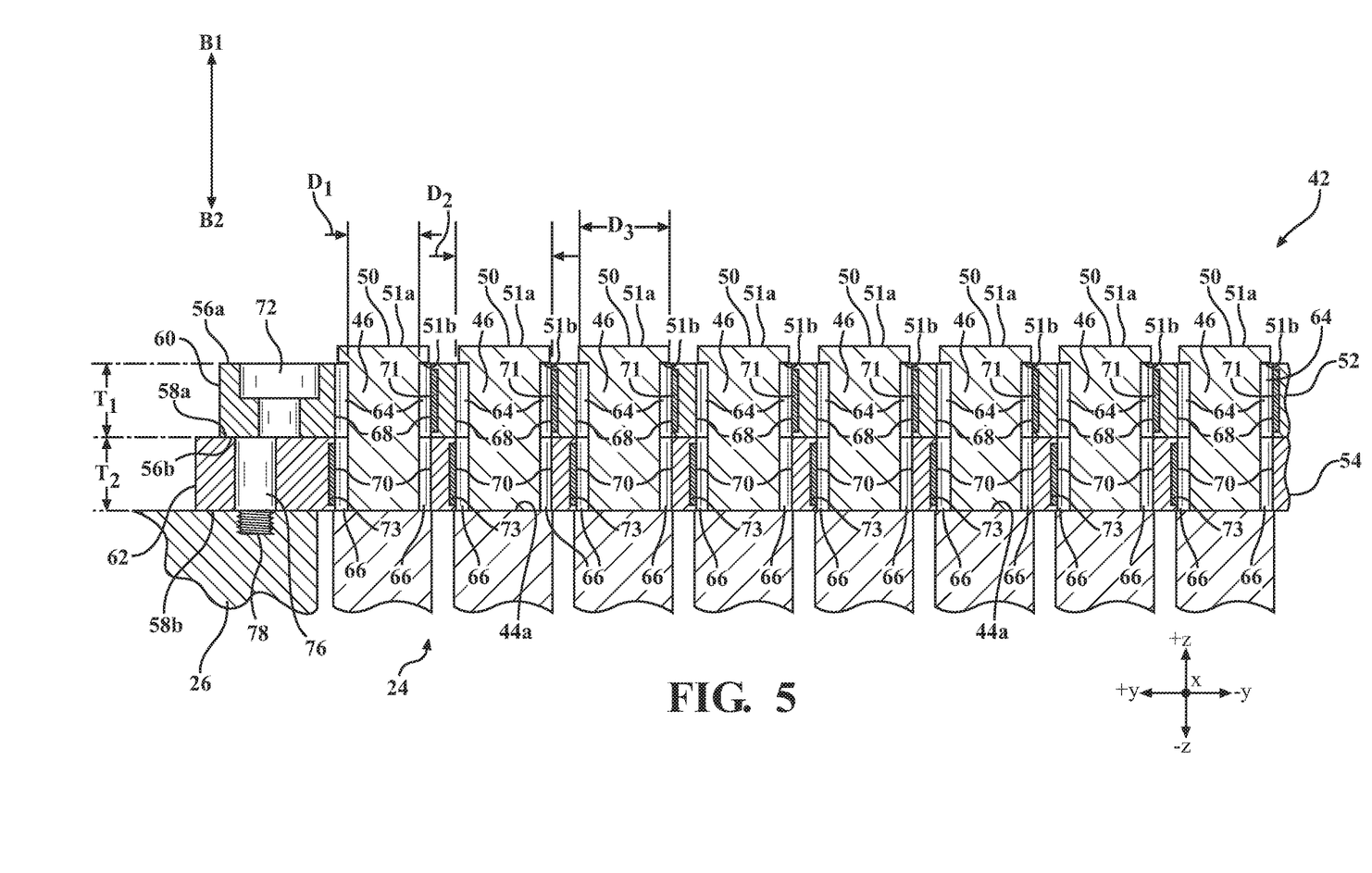
FIG. 5 schematically depicts a partial cross-sectional view of the battery pack assembly of FIG. 4 taken from the line 5-5 with pair of elongated terminal plates in the aligned position, according to one or more embodiments described herein.

Referring to FIGS. 4 and 5, the pair of elongated terminal plates 36 will now be described. The pair of elongated terminal plates 36 extend along the terminal side 40a of the plurality of battery cells 24 in a direction, or pattern, transverse to the pair of terminals 42 of each battery cell 24a of the plurality of battery cells 24. That is, in some embodiments, when the pair of terminals 42 are arranged along the terminal surface 44a in the lateral direction (i.e., in the +/−Y direction), the pair of elongated terminal plates 36 extend in the longitudinal direction (i.e., in the +/−X direction). In other embodiments, when the pair of terminals 42 are arranged along the terminal surface 44a in the longitudinal direction, (i.e., in the +/−X direction), as illustrated, the pair of elongated terminal plates 36 extend in the lateral direction (i.e., in the +/−Y direction).

Referring to FIG. 5, each of the pair of elongated terminal plates 36 each include an upper elongated terminal connector plate 52 and a lower elongated terminal connector plate 54. The lower elongated terminal connector plate 54 is positioned between the upper elongated terminal connector plate 52 and the terminal surface 44a of each of the plurality of battery cells 24. Each of the upper elongated terminal connector plates 52 includes a pair of ends 60 and each of the lower elongated terminal connector plates 54 includes a pair of ends 62.

The upper elongated terminal connector plate 52 includes an exterior surface 56a and an opposite interior surface 56b that defines a thickness T1. The interior surface 56b faces the terminal surface 44a of the plurality of battery cells 24. The lower elongated terminal connector plate 54 includes a top surface 58a and an opposite bottom surface 58b that defines a thickness T2. The top surface 58a of the lower elongated terminal connector plate 54 faces the interior surface 56b of the upper elongated terminal connector plate 52 while the bottom surface 58b of the lower elongated terminal connector plate 54 faces the terminal surface 44a of the plurality of battery cells 24. In some embodiments, the bottom surface 58b of the lower elongated terminal connector plate 54 may be in contact with the terminal surface 44a of the plurality of battery cells 24.

In some embodiments, the interior surface 56b of the upper elongated terminal connector plate 52 and the top surface 58a of the lower elongated terminal connector plate 54 slidably contact, or slidably engage with one another. In some embodiments, the thickness T1 and thickness T2 are equal and uniform along each of pair of elongated terminal plates 36. In other embodiments, the thickness T1 is greater than the thickness T2. In yet other embodiments, the thickness T1 is less than the thickness T2. Further, in some embodiments, the thickness T1 and/or the thickness T2 may be irregular. For example, the thickness T1 may be greater at each end 60 of the upper elongated terminal connector plate 52 than a middle portion of the upper elongated terminal connector plate 52. In another example, the thickness T2 may be greater at each end 62 of the lower elongated terminal connector plate 54 than a middle portion of the lower elongated terminal connector plate 54.

The upper elongated terminal connector plate 52 includes a plurality of upper openings 64. The lower elongated terminal connector plate 54 includes a plurality of lower openings 66. The plurality of upper openings 64 extend between the exterior surface 56a and the interior surface 56b of the upper elongated terminal connector plate 52. The plurality of lower openings 66 extend between the top surface 58a and the bottom surface 58b of the lower elongated terminal connector plate 56. In some embodiments, each of the plurality of upper and lower openings 64, 66 have an opening diameter D3. That is, the plurality of upper and lower openings 64, 66 have an equal diameter. In other embodiments, some of or all of the plurality of lower openings 66 have a larger diameter than some of or all of the plurality of upper openings 64. In yet other embodiments, some or all of the plurality of upper openings 64 have a larger diameter than some or all of the plurality of lower openings 66. The flange diameter D2 is smaller, or less than the opening diameter D3. Further, the plurality of upper openings 64 each have an upper side edge portion 68 and the plurality of lower openings 66 each have a lower side edge portion 70.

The upper elongated terminal connector plate 52 further includes at least one upper aperture 72 positioned at one end 60 of the upper elongated terminal connector plate 52. The at least one upper aperture 72 is configured to receive a fastener 74 such as a bolt, a screw, a rivet, and the like. In some embodiments, the at least one upper aperture 72 is threaded to assist in retaining the fastener 74. In other embodiments, the at least one upper aperture 72 is a through hole. The lower elongated terminal connector plate 54 further includes at least one lower aperture 76 positioned at one end 62 of the lower elongated terminal connector plate 54. The at least one lower aperture 76 is configured to receive the fastener 74. In some embodiments, the at least one lower aperture 76 is threaded to assist in retaining the fastener 74. In other embodiments, the at least one lower aperture 76 is a through hole.

The exterior and interior surfaces 56a, 56b of the upper elongated terminal connector plate 52 are generally formed of an insulating material. In some embodiments, the insulating material is a thermoplastic such as a polyetheretherkeytone (PEEK), a plastic such as polypropylene, polyvinyl chloride (PVC), Polybutylene Terephthalate (PET), and the like. It should be appreciated that, in some embodiments, the upper elongated terminal connector plate 52 may have a plurality of layers of the thermoplastic material, the plastic material, and the like, arranged in the vertical direction (i.e., in the +/−Z direction) with different materials between the layers, such as a conductive material, as discussed in greater detail herein. In other embodiments, the exterior surface 56a may be one insulating material, the interior surface 56b is the same or a different insulating material, and there may be layers of insulating material therebetween, a single insulating layer, a single conductive layer, a combination thereof, and the like, as discussed in greater detail herein.

Further, the top and bottom surfaces 58a, 58b of the lower elongated terminal connector plates 54 are generally formed of the insulating material. In some embodiments, the insulating material is the thermoplastic such as PEEK, a plastic such as polypropylene, PVC, PET, and the like. It should be appreciated that, in some embodiments, the lower elongated terminal connector plate 54 may have a plurality of layers of the thermoplastic material, the plastic material, and the like, arranged in the vertical direction (i.e., in the +/−Z direction) with different materials between the layers, such as a conductive material, as discussed in greater detail herein. In other embodiments, the top surface 58a may be one insulating material, the bottom surface 58b is the same or a different insulating material, and there may be layers of insulating material therebetween, a single insulating layer, a single conductive layer, a combination thereof, and the like, as discussed in greater detail herein.

Figure 6:
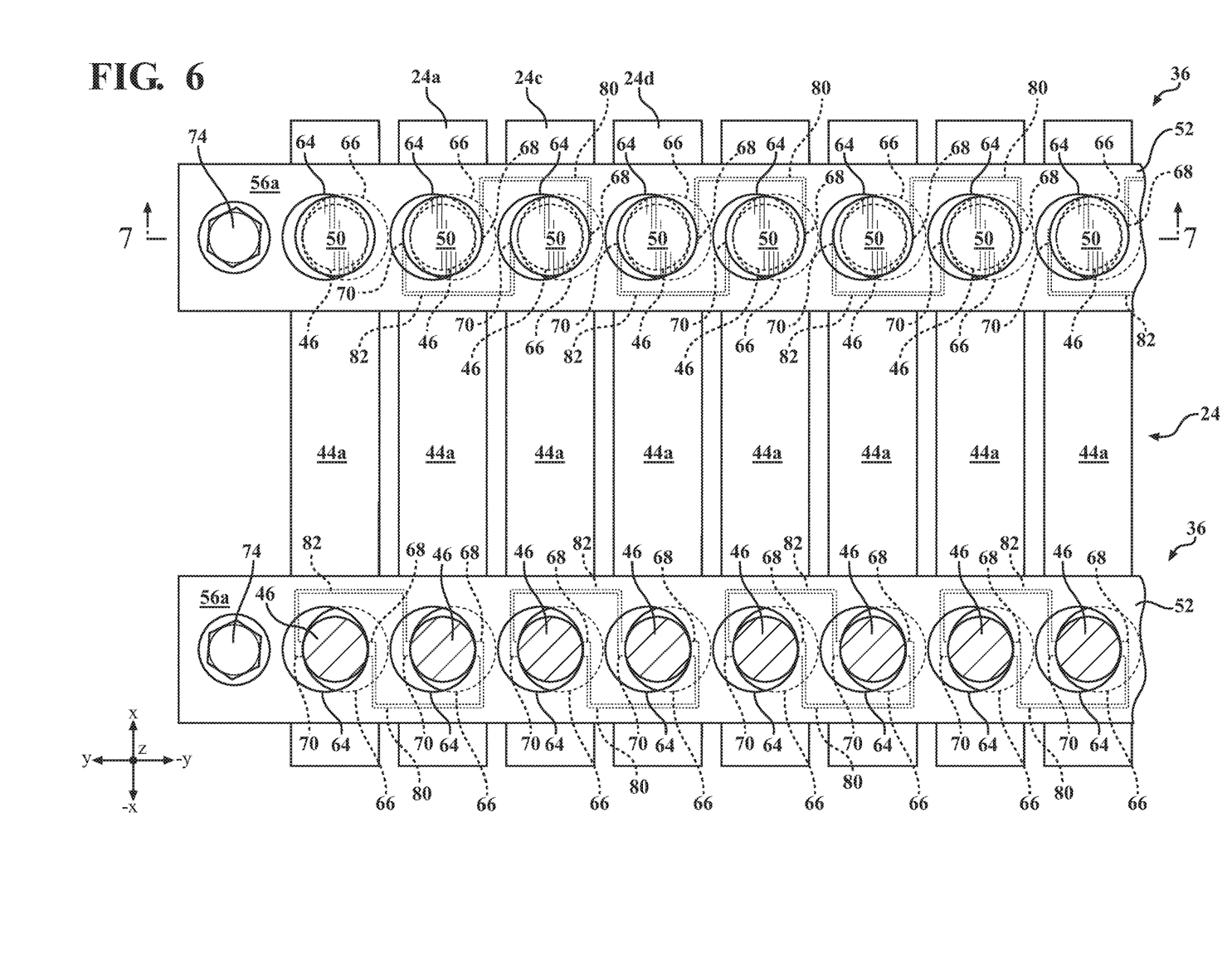
FIG. 6 schematically depicts a partial isolated top of the battery pack assembly of FIG. 1 with the pair of elongated terminal plates in an engaged position, according to one or more embodiments described herein.
Figure 7:
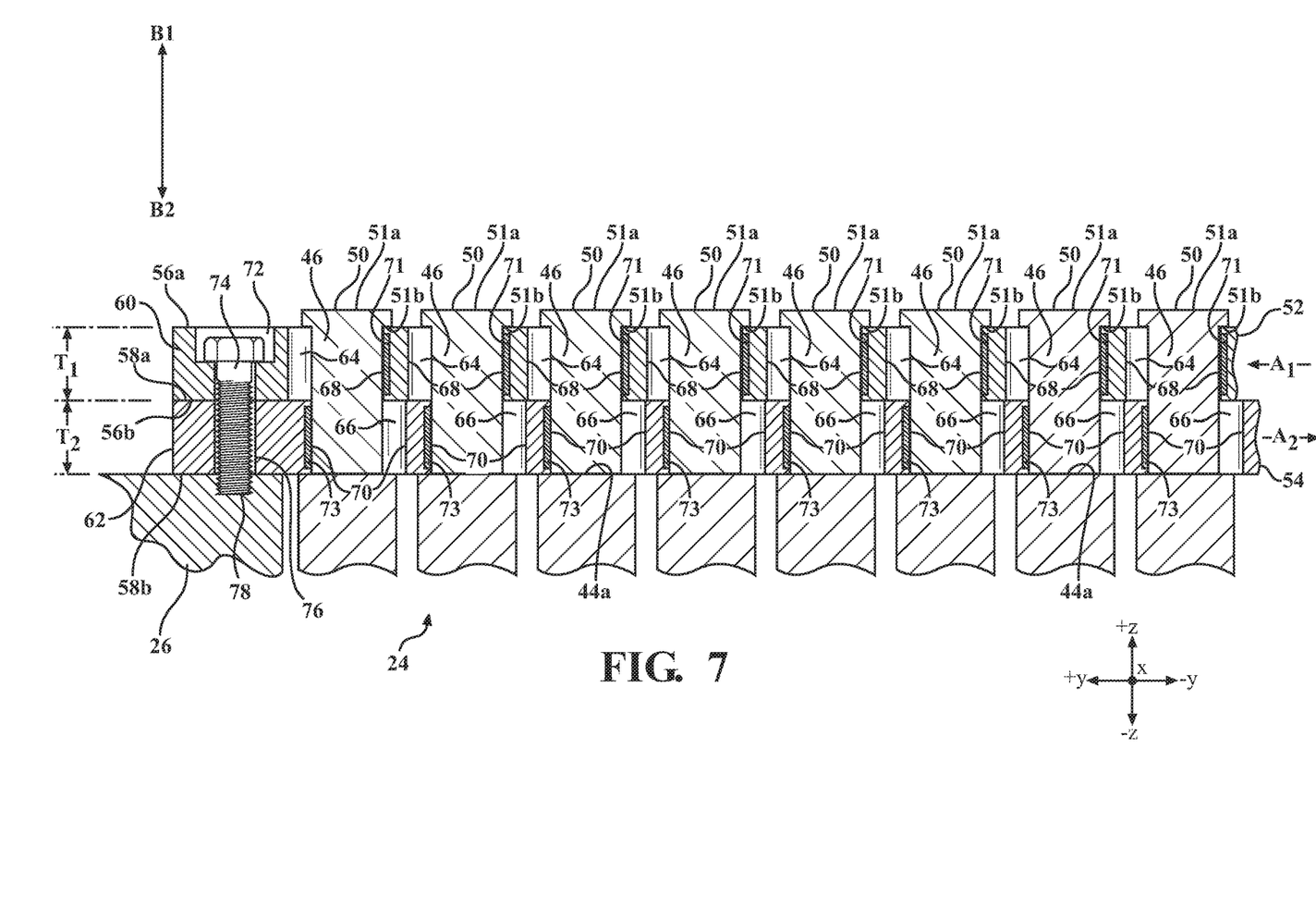
FIG. 7 schematically depicts a partial cross-sectional view of the battery pack assembly of FIG. 6 taken from the line 7-7 with the elongated terminal plates in the engaged position, according to one or more embodiments described herein.

The upper elongated terminal connector plate 52 and the lower elongated terminal connector plate 56 each independently move between an aligned position, as best seen in FIGS. 4 and 5, and an engaged position, as best seen in FIGS. 6 and 7, as described in greater detail herein.

Still referring to FIGS. 4-5, in the aligned position, each post 46 and flange 50 of the plurality of battery cells 24 are spaced apart from the aligned plurality of upper and lower openings 64, 66. As such, in the aligned position, the upper elongated terminal connector plate 52 and the lower elongated terminal connector plate 54 are in a disengaged state with respect to each post 46 and flange 50 of the plurality of battery cells 24. Specifically, in the aligned position, the plurality of upper and lower openings 64, 66 are coaxially aligned such that the flange 50 of each post 46 may pass through the coaxially aligned plurality of upper and lower openings 64, 66 and each of the plurality of upper and lower openings 64, 66 receive at least a portion of the post 46 of the pair of terminals 42 extending from each battery cell of the plurality of battery cells 24. That is, when the plurality of upper and lower openings 64, 66 are coaxially aligned, in some embodiments, the upper side edge portion 68 of the plurality of upper openings 64 are coaxially aligned with the lower side edge portion 70 of the plurality of lower openings 66.

In other embodiments, the diameter of the lower side edge portion 70 of the plurality of lower openings 66 is larger than the diameter of plurality of upper openings 64 such that a center point of the plurality of upper openings 64 is coaxially aligned with a center point of the plurality of lower openings 66 but the upper side edge portion 68 of the plurality of upper openings 64 is not coaxially aligned with the lower side edge portion 70 of the plurality of lower openings 66. It should be understood that when the pair of elongated terminal plates 36 is installed onto or removed from the terminal surface 44a, the upper side edge portion 68 of the plurality of upper openings 64 and the lower side edge portion 70 of the plurality of lower openings 66 are not in contact with, or disengaged from the flange 50 and the post 46 of the plurality of battery cells 24.

That is, it should be understood that the diameter of the plurality of upper and lower openings D3 is larger than the diameter D2 of the flange 50 and D1 of the post 46 such that the pair of elongated terminal plates 36 may be inserted onto the terminal surface 44a of the plurality of battery cells 24 in an insertion direction B2 and/or removed from the terminal surface 44a of the plurality of battery cells 24 in a removal direction B1. As such, when the pair of elongated terminal plates 36 are removed from the terminal surface 44a of the plurality of battery cells 24, the plurality of battery cells 24 may be removed from the battery pack assembly 20 (FIG. 1) In the aligned position, the flange 50 may be positioned above the exterior surface 56a of the upper elongated terminal connector plate 52 in the vertical direction (i.e., in the +/−Z direction).

Further, in the aligned position, the at least one upper aperture 72 and the at least one lower aperture 76 are each offset from one another, or are not coaxially aligned. As such, the fastener 74 is blocked or prohibited from extending through both the upper elongated terminal connector plate 52 and the lower elongated terminal connector plate 54 to prevent the fastener 74 from being secured to the end retaining walls 26 of the housing 22 via the retaining cavity 78.

Referring to FIGS. 6 and 7, in the engaged position, the upper and lower elongated terminal connector plates 52, 54 are inhibited from moving in the removal direction B1. Further, each of the plurality of battery cells 24 are inhibited from moving in the removal direction B1 such that each of the plurality of battery cells 24 are retained. In the engaged position, each post 46 is in an engaged state in which the upper side edge portion 68 of the plurality of upper openings 64 and with the lower side edge portion 70 of the plurality of lower openings 66 contact each post 46. In some embodiments, in the engaged position, the flange 50 of each post 46 is in an engaged state in which the inner surface 5lb of the flange 50 contacts the exterior surface 56a of the upper elongated terminal connector plate 52.

To achieve the engaged position, at least one of the upper elongated terminal connector plate 52 and the lower elongated terminal connector plate 54 is linearly displaced. In some embodiments, the upper elongated terminal connector plate 52 is linearly displaced in one direction and the lower elongated terminal connector plate 54 is linearly displaced in an opposite direction such that the plurality of upper openings 64 and the plurality of lower openings 66 are configured to engage the respective post 46 of the pair of terminals 42 of each battery cell of the plurality of battery cells 24. That is, the upper elongated terminal connector plate 52 is linearly displaced in the lateral direction (i.e., in the +/−Y direction) illustrated with the arrow A1 and the lower elongated terminal connector plate 54 is linearly displaced in the opposite lateral direction (i.e., in the +/−Y direction) illustrated with the arrow A2. It should be appreciated that direction A1 is opposite of the direction A2.

Further, in the engaged position, the upper and lower side edge portions 68, 70 are in contact with each post 46 of the pair of terminals 42 such that each post 46 is retained against the upper side edge portion 68 of the respective upper opening of the plurality of upper openings 64 and the lower side edge portion 70 of the respective lower openings of the plurality of lower openings 66. In some embodiments, a portion of the upper side edge portion 68 of the plurality of upper openings 64 and a portion of the lower side edge portion 70 of the plurality of lower openings 66 is an upper and lower conductive portions 71, 73 respectively.

It should be appreciated that, in some embodiments, the upper conductive portion 71 of the upper side edge portion 68 may be positioned at an opposite end of the plurality of upper openings 64 than the lower conductive portion 73 of the lower side edge portion 70 of the plurality of lower openings 66. In other embodiments, the upper conductive portion 71 of the upper side edge portion 68 may be positioned at the same end of the plurality of upper openings 64 as the lower conductive portion 73 of the lower side edge portion 70 of the plurality of lower openings 66. Further, in other embodiments, the upper and lower conductive portions 71, 73 of the upper and lower side edge portions 68, 70 may be an annular ring within the plurality of upper and lower openings 64, 66. In the embodiments described herein, in the engaged position, the upper elongated terminal connector plate 52 and the lower elongated terminal connector plate 54 are independently electrically coupled to each of the plurality of battery cells 24 via the upper and lower conductive portions 71, 73 in contact with each post 46 of the pair of terminals 42.

The upper conductive portion 71 of the upper side edge portion 68 and the lower conductive portion 73 of the lower side edge portion 70 are independently communicatively coupled to an upper conductive path 80 and a lower conductive path 82 respectively, as discussed in greater detail herein. As such, the upper conductive portion 71 of the upper side edge portion 68 and the lower conductive portion 73 of the lower side edge portion 70 are configured to carry the energy stored within each of the plurality of battery cells 24 to the upper and lower conductive paths 80, 82 respectively and ultimately to the pair of load wires 38a, 38b via the upper and lower conductive paths 80, 82 for use by components of the vehicle 10. As such, in some embodiments, the upper and lower conductive portions 71, 73 of the upper and lower side edge portions 68, 70 are each a conductive metal material such as silver (Ag), copper (Cu), gold (Au), aluminum (Al), and the like. In other embodiments, the conductive portion of the upper and lower side edge portions 68, 70 are each a conductive material such as a beryllium (Be), calcium (Ca) magnesium (Mg), rhodium (Rh), sodium (Na), iridium (Ir), and the like.

In some embodiments, in the engaged position, the at least one upper and lower apertures 72, 76 are coaxially aligned such that the fastener 74 may extend through both the upper elongated terminal connector plate 52 and the lower elongated terminal connector plate 54 such that the fastener 74 may be secured to the housing 22 via a retaining cavity 78. In some embodiments, the retaining cavity may be internally threaded. In other embodiments, the retaining cavity is a bore. Further, in some embodiments the ends 60, 62 of both the upper and lower elongated terminal connector plates 52, 54 terminate equally at the end retaining walls 26 of the housing 22 in the engaged position. In other embodiments, the ends 60, 62 of both the upper and lower elongated terminal connector plates 52, 54 terminate staggered at the end retaining walls 26 of the housing 22 in the engaged position.

Referring to FIG. 7, the inner surface 51b of the flange 50 contacts the exterior surface 56a of the upper elongated terminal connector plate 52 to retain the pair of elongated terminal plates 36 and to inhibit the pair of elongated terminal plates 36 moving in the removal direction B1. That is, in the engaged position, a portion of the exterior surface 56a of the upper elongated terminal connector plate 52 is positioned in contact with the inner surface 51b of the flange 50 such that the flange 50 inhibits removal of the pair of elongated terminal plates 36 in the removal direction B1. Further, in the engaged position, at least a portion of the upper side edge portion 68 of the plurality of upper openings 64 are offset from the lower side edge portion 70 of the plurality of lower openings 66. That is, in the engaged position, the upper conductive portion 71 of the plurality of upper openings 64 are in contact with one portion of each post 46 and at least a portion of the upper side edge portion 68 does not make contact with any portion of each post 46. Further, the lower conductive portion 73 of the plurality of lower openings 66 are in contact with a different portion of each post 46 than the upper conductive portion 71 of the plurality of upper openings 64 and at least a portion of the lower side edge portion 70 does not make contact with any portion of each post 46.

As such, it should be understood that the upper conductive portion 71 of the upper side edge portion 68 is also offset, or at an opposite side, from the lower conductive portion 73 of the lower side edge portion 70 with reference to the post 46. Further, it should be understood that the portion of the upper side edge portion 68 not in contact with the post 46 is offset, or at an opposite side, than the lower side edge portion 70 not in contact with the post 46. It should be appreciated that in some embodiments, when the upper conductive portion 71 of the plurality of upper openings 64 are in contact with a portion of each post 46, directly below the upper conductive portion 71 in the vertical direction (i.e., in the +/−Z direction) is the portion of the lower side edge portion 70 not in contact with the post 46. In embodiments, when the lower conductive portion 73 of the plurality of lower openings 66 are in contact with a portion of each post 46, directly above the lower conductive portion 73 in the vertical direction (i.e., in the +/−Z direction) is the portion of the upper side edge portion 68 not in contact with the post 46.

As discussed above, the upper conductive portion 71 of the upper side edge portion 68 is communicatively coupled to the upper conductive path 80 and the lower conductive portion 73 of the lower side edge portion 70 is communicatively coupled to the lower conductive path 82. The upper conductive path 80 extends through the upper elongated terminal connector plate 52 and the lower conductive path 82 extends through the lower elongated terminal connector plate 54. As such, it should be appreciated that the upper conductive path 80 is communicatively coupled to each of the plurality of upper openings 64 of the upper elongated terminal connector plate 52 via the upper conductive portion 71 and the lower conductive path 82 is communicatively coupled to each of the plurality of lower openings 66 of the lower elongated terminal connector plate 54 via the lower conductive portion 73.

The upper and lower conductive paths 80, 82 are each communicatively coupled to the pair of load wires 38a, 38b. In some embodiments, the upper and lower conductive paths 80, 82 are each a busbar that is coupled to the pair of load wires 38a, 38b via terminals, fittings, lugs, and the like. In other embodiments, the upper and lower conductive paths 80, 82 are traces within a circuit board and are each communicatively coupled to the pair of load wires 38a, 38 via a wire harness, and the like. The upper and lower conductive paths 80, 82 are each configured to carry the energy stored within each of the plurality of battery cells 24 to the pair of load wires 38a, 38b for use by the components of the vehicle 10. As such, in some embodiments, the upper and lower conductive paths 80, 82 are each a conductive metal material such as silver (Ag), copper (Cu), gold (Au), aluminum (Al), and the like. In other embodiments, the upper and lower conductive paths 80, 82 are each a conductive material such as a beryllium (Be), calcium (Ca) magnesium (Mg), rhodium (Rh), sodium (Na), iridium (Ir), and the like.

In some embodiments, the upper conductive path 80 is positioned between the exterior and interior surfaces 56a, 56b of the upper elongated terminal connector plate 52. That is, the upper conductive path 80 extends through each upper elongated terminal connector plate 52 of the pair of elongated terminal plates 36 such that the upper conductive path 80 is sandwiched between insulating materials. As such, the upper conductive path 80 is electrically insulated from any component above or below, in front or behind, and on both sides of the upper elongated terminal connector plate 52. The upper conductive path 80 includes portions that extend in the lateral direction (i.e., in the +/−Y direction) and in the longitudinal direction (i.e., in the +/−X direction) and has a thickness in the vertical direction (i.e., in the +/−Z direction). The upper conductive path 80 may be a trace similar to that found in circuit boards, printed circuit boards, and the like.

In some embodiments, the upper conductive path 80 in one of the upper elongated terminal connector plates 52 of the pair of elongated terminal plates 36 is configured to communicatively couple a positive polarity terminal from the battery cell 24a of the plurality of battery cells 24 to a negative polarity terminal of the adjacent battery cell 24c of the plurality of battery cells 24. The upper conductive path 80 of the other one of the upper elongated terminal connector plate 52 of the pair of elongated terminal plates 36 is configured to communicatively couple a negative polarity terminal from the adjacent battery cell 24c of the plurality of battery cells 24 to a positive polarity terminal of a second adjacent battery cell 24d of the plurality of battery cells 24.

In other embodiments, the upper conductive path 80 in one of the upper elongated terminal connector plates 52 of the pair of elongated terminal plates 36 is configured to communicatively couple the negative polarity terminal from the battery cell 24a of the plurality of battery cells 24 to the positive polarity terminal of the adjacent battery cell 24c of the plurality of battery cells 24. The upper conductive path 80 of the other one of the upper elongated terminal connector plate 52 of the pair of elongated terminal plates 36 is configured to communicatively couple the positive polarity terminal from the adjacent battery cell 24c of the plurality of battery cells 24 to the negative polarity terminal of a second adjacent battery cell 24d of the plurality of battery cells 24.

As such, it is understood that the upper conductive path 80 completes or closes an electrical circuit between adjacent battery cells of the plurality of battery cells 24 such that the upper conductive paths 80 of upper elongated terminal connector plates 53 daisy chain, or electrically positions the plurality of battery cells 24 into a series configuration. That is, the pair of upper elongated terminal connector plates 52 together electrically position the plurality of battery cells 24 into a series configuration such that the energy stored in each battery cell of the plurality of battery cells 24 is maximized for transfer to other components of the vehicle 10. In some embodiments, the upper conductive path 80 may further include a continuous portion (not shown) that extends the length of each one of the pair of the upper elongated terminal connector plates 52 of the pair of elongated terminal plates 36 and which is communicatively coupled to the upper conductive path 80.

In some embodiments, the lower conductive path 82 is positioned between the top and bottom surfaces 58a, 58b of each of the lower elongated terminal connector plates 54. That is, the lower conductive path 82 extends through each of the lower elongated terminal connector plates 54 such that the lower conductive path 82 is sandwiched between insulating materials. As such, the lower conductive path 82 is electrically insulated from any component above or below, in front or behind, and on both sides of the lower elongated connector terminal plate. The lower conductive path 82 includes portions that extend in the lateral direction (i.e., in the +/−Y direction) and in the longitudinal direction (i.e., in the +/−X direction) and has a thickness in the vertical direction (i.e., in the +/−Z direction). The lower conductive path 82 may be a trace similar to that found in circuit boards, printed circuit boards, and the like. Further, the lower conductive path 82 may mimic the pattern of the upper conductive path 80 in the lateral and the longitudinal directions or may deviate from the same pattern in the lateral and the longitudinal directions. Further, the thickness of the lower conductive path 82 may be equal to the thickness of the upper conductive path 80 or may vary in thickness from the upper conductive path 80.

In some embodiments, the lower conductive path 82 in one of the lower elongated terminal connector plates 54 of the pair of elongated terminal plates 36 is configured to communicatively couple a positive polarity terminal from the battery cell 24a of the plurality of battery cells 24 to a negative polarity terminal of the adjacent battery cell 24c of the plurality of battery cells 24. The lower conductive path 82 of the other one of the lower elongated terminal connector plate 54 of the pair of elongated terminal plates 36 is configured to communicatively couple a negative polarity terminal from the adjacent battery cell 24c of the plurality of battery cells 24 to a positive polarity terminal of a second adjacent battery cell 24d of the plurality of battery cells 24.

In other embodiments, the lower conductive path 82 in one of the lower elongated terminal connector plates 54 of the pair of elongated terminal plates 36 is configured to communicatively couple the negative polarity terminal from the battery cell 24a of the plurality of battery cells 24 to the positive polarity terminal of the adjacent battery cell 24c of the plurality of battery cells 24. The lower conductive path 82 of the other one of the lower elongated terminal connector plates 54 of the pair of elongated terminal plates 36 is configured to communicatively couple the positive polarity terminal from the adjacent battery cell 24c of the plurality of battery cells 24 to the negative polarity terminal of a second adjacent battery cell 24d of the plurality of battery cells 24.

Figure 8:
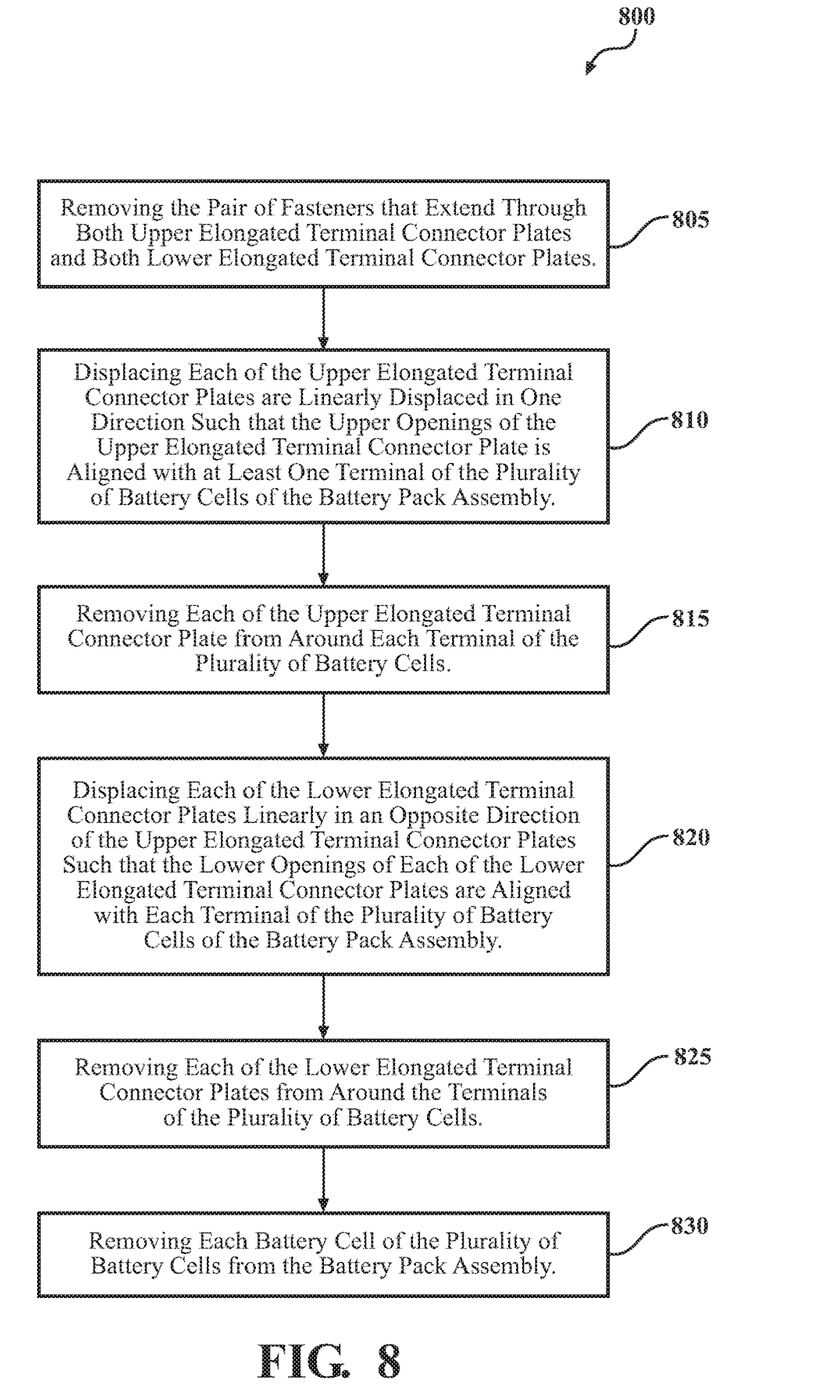
FIG. 8 depicts a flowchart of an illustrative method of removing a battery cell from a battery pack assembly of FIG. 1 according to one or more embodiments shown or described herein.

Now referring to FIG. 8 and referring back to FIGS. 1-7, a flowchart of an illustrative method 800 of removing the battery cell 24a from the battery pack assembly 20 of FIG. 1 is depicted. At block 805, the pair of fasteners 74 that extend through both upper elongated terminal connector plates 52 and both lower elongated terminal connector plates 54 are removed. At block 810, each of the upper elongated terminal connector plates 52 are linearly displaced in one direction, such as the lateral direction (i.e., in the +/−Y direction) illustrated with the arrow A1 such that the plurality of upper openings 64 of the upper elongated terminal connector plate 52 is aligned with at least one terminal 42 of the plurality of battery cells 24 of the battery pack assembly 20.

At block 815, each of the upper elongated terminal connector plates 52 are removed from around each terminal 42 of the plurality of battery cells 24 in the removal direction B1. At block 820, each of the lower elongated terminal connector plates 54 are linearly displaced in an opposite direction of the upper elongated terminal connector plates 52, such as the lateral direction (i.e., in the +/−Y direction) illustrated with the arrow A2, such that the plurality of lower openings 66 of each of the lower elongated terminal connector plates 54 are aligned with the terminal 42 of the plurality of battery cells 24 of the battery pack assembly 20. At block 825, each of the lower elongated terminal connector plates 54 are removed from around the terminal 42 of the plurality of battery cells 24 in the removal direction B1. It should be understood that blocks 810 and 820 may be performed simultaneously and/or in the same step. Further, it should be appreciated that blocks 815 and 825 may be performed simultaneously and/or in the same step. At block 830, each battery cell 24a of the plurality of battery cells 24 is removed from the battery pack assembly 20.

The above described battery pack assembly provides for a pair of elongated terminal connector plates that electrically connect each of a plurality of battery cells to a vehicle component while retaining the plurality of battery cells within a housing. The pair of elongated terminal connector plates are configured to be easily removed by taking out a pair of fasteners and linearly displacing an upper elongated terminal connector plate in one direction and linearly displacing a lower elongated terminal connector plate in an opposite direction. One of the pair of elongated terminal connector plates are removed from the battery pack assembly, each battery cell of the plurality of battery cells may be removed from the battery pack assembly.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery pack assembly comprising:
a plurality of battery cells, each battery cell of the plurality of battery cells having a pair of terminals extend from each of the plurality of battery cells, and
a pair of elongated terminal plates extending across a length of the battery pack assembly, each of the pair of elongated terminal plates includes an upper elongated terminal connector plate and a lower elongated terminal connector plate, each of the upper elongated terminal connector plate and the lower elongated terminal connector plate of each of the pair of elongated terminal plates are configured to independently move between an aligned position and an engaged position, in the engaged position the pair of elongated terminal plates engage the pair of terminals of the plurality of battery cells to inhibit removal of the plurality of battery cells from the battery pack assembly, and in the aligned position the pair of elongated terminal plates disengage from the pair of terminals of the plurality of battery cells.

2. The battery pack assembly of claim 1, wherein:
the upper elongated terminal connector plate has a plurality of upper openings, each of the plurality of upper openings having an upper side edge and the lower elongated terminal connector plate has a plurality of lower openings, each of the plurality of lower openings having a lower side edge,
wherein in the aligned position, the plurality of upper openings and the plurality of lower openings are each configured to receive at least a portion of the pair of terminals of each battery cell of the plurality of battery cells.

3. The battery pack assembly of claim 2, wherein in the engaged position, a portion of the upper side edge of each of the plurality of upper openings is offset from the a portion of the lower side edge of each of the plurality of lower openings.

4. The battery pack assembly of claim 2, wherein:
in the engaged position, the upper elongated terminal connector plate is linearly displaced in one direction and the lower elongated terminal connector plate is linearly displaced in an opposite direction such that the plurality of upper openings and the plurality of lower openings are configured to engage with a different portion of the pair of terminals of each of the plurality of battery cells.

5. The battery pack assembly of claim 2, wherein the lower elongated terminal connector plate is positioned between the upper elongated terminal connector plate and a terminal surface of each of the plurality of battery cells.

6. The battery pack assembly of claim 2, wherein:
the upper elongated terminal connector plate includes a first aperture, and
the lower elongated terminal connector plate includes a second aperture such that in the engaged position, the first aperture and the second aperture are coaxially aligned and the upper and lower elongated terminal connector plates are secured to the battery pack assembly by a fastener.

7. The battery pack assembly of claim 2, wherein the pair of terminals of each of the plurality of battery cells are provided with a post that extends upwardly from a terminal surface of each of the plurality of battery cells and a flange extending radially outward from a distal end of the post, the flange has a diameter that is smaller than a diameter of the plurality of upper and lower openings.

8. The battery pack assembly of claim 7, wherein:
in the aligned position the plurality of upper openings and the plurality of lower openings are coaxially aligned such that the flange passes through the plurality of upper openings and the plurality of lower openings, and
in the engaged position, a portion of the flange is in contact with an exterior surface of the upper elongated terminal connector plate to retain the pair of elongated terminal plates and to inhibit removal of the plurality of battery cells from the battery pack assembly.

9. The battery pack assembly of claim 8, wherein a portion of the upper side edge of the plurality of upper openings and a portion of the lower side edge of the plurality of lower openings is conductive such that in the engaged position, the upper elongated terminal connector plate and the lower elongated terminal connector plate of each of the pair of elongated terminal plates are electrically coupled to each of the plurality of battery cells via the pair of terminals.

10. An assembly comprising:
a battery pack assembly having a plurality of battery cells, each of the plurality of battery cells include a pair of terminals that extend from a terminal surface of each of the plurality of battery cells;
a pair of elongated terminal plates extending across a length of the battery pack assembly, each of the pair of elongated terminal plates having:
an upper elongated terminal connector plate having upper openings that correspond to at least one of the pair of terminals; and
a lower elongated terminal connector plate having lower openings that correspond to the at least one of the pair of terminals,
wherein the upper elongated terminal connector plate and the lower elongated terminal connector plate are each configured to independently move between an aligned position and an engaged position, in the aligned position the upper openings and the lower openings are coaxially aligned to each receive at least a portion of the pair of terminals of each of the plurality of battery cells such that the upper elongated terminal connector plate and the lower elongated terminal connector plate are disengaged from the pair of terminals of the plurality of battery cells and in the engaged position a portion of each of the upper openings and the lower openings engage the pair of terminals of each the plurality of battery cells such that the upper elongated terminal connector plate and the lower elongated terminal connector plate inhibit removal of the plurality of battery cells from the battery pack assembly.

11. The assembly of claim 10, wherein:
in the aligned position, the upper elongated terminal connector plate and the lower elongated terminal connector plate are disengaged from the pair of terminals of each of the plurality of battery cells to permit removal of the plurality of battery cells from the battery pack assembly.

12. The assembly of claim 10, wherein in the engaged position each of the upper openings is offset from each of the lower openings.

13. The assembly of claim 12, wherein:
in the engaged position, the upper elongated terminal connector plate is linearly displaced in one direction and the lower elongated terminal connector plate is linearly displaced in an opposite direction such that the upper openings and the lower openings are configured to engage with a different portion of the pair of terminals of each of the plurality of battery cells.

14. The assembly of claim 10, wherein:
the upper elongated terminal connector plate includes a first aperture, and
the lower elongated terminal connector plate includes a second aperture such that in the engaged position, the first aperture and the second aperture are coaxially aligned and the upper and lower elongated terminal connector plates are secured to the battery pack assembly by a fastener.

15. The assembly of claim 10, wherein each of the pair of terminals are provided with a post that extends upwardly from the terminal surface of the plurality of battery cells and a flange extending radially outward from a distal end of the post.

16. The assembly of claim 15, wherein the flange has a diameter that is smaller than the diameter of the upper openings and the lower openings.

17. The assembly of claim 16, wherein:
in the aligned position the upper openings and the lower openings are coaxially aligned such that the flange passes through the upper openings and the lower openings, and
in the engaged position, a portion of the flange is in contact with an exterior surface of the upper elongated terminal connector plate to retain the upper elongated terminal connector plate and the lower elongated terminal connector plate.

18. The assembly of claim 17, wherein a portion of an upper side edge of the upper openings and a portion of a lower side edge of the lower openings is conductive such that in the engaged position, the upper elongated terminal connector plate and the lower elongated terminal connector plate are electrically coupled to each of the plurality of battery cells via the pair of terminals.

19. A method of removing a battery cell from a battery pack assembly, the method comprising:
displacing a pair of elongated terminal plates extending across a length of the battery pack assembly, each of the pair of elongated terminal plates having an upper elongated terminal connector plate that is displaced linearly in one direction such that an upper opening of the upper elongated terminal connector plate is aligned with at least one terminal of a pair of terminals of each battery cell of a plurality of battery cells of the battery pack assembly to disengage from the at least one terminal of a pair of terminals of each battery cell and a lower elongated terminal connector plate that is displaced linearly in an opposite direction such that a lower opening of the lower elongated terminal connector plate is aligned with the at least one terminal of the pair of terminals of each battery cell of the battery pack assembly to disengage from the at least one terminal of a pair of terminals of each battery cell;
removing the upper and lower elongated terminal connector plates from around the at least one terminal of each of the plurality of battery cells of the battery pack assembly and
removing the at least one battery cell from the battery pack assembly.

20. The method of claim 19, wherein:
each terminal of the at least one terminal is provided with a post that extends upwardly from a terminal surface of each of the at least one battery cell and a flange extending radially outward from a distal end of the post,
the flange has a diameter that is smaller than the diameter of the upper opening and the lower opening, and
the flange passes through the upper opening and the lower opening when removing the upper elongated terminal connector plate and the lower elongated terminal connector plate from around the terminal.

* * * * *